United States Patent
Zhang et al.

(10) Patent No.: US 10,625,486 B2
(45) Date of Patent: Apr. 21, 2020

(54) METHODS OF PRODUCING THERMOPLASTIC COMPOSITES USING FABRIC-BASED THERMOPLASTIC PREPREGS

(71) Applicant: JOHNS MANVILLE, Denver, CO (US)

(72) Inventors: Mingfu Zhang, Englewood, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 142 days.

(21) Appl. No.: 15/187,262

(22) Filed: Jun. 20, 2016

(65) Prior Publication Data

US 2017/0361546 A1  Dec. 21, 2017

(51) Int. Cl.
*B29C 70/32* (2006.01)
*B32B 1/08* (2006.01)
(Continued)

(52) U.S. Cl.
CPC .............. *B32B 1/08* (2013.01); *B29C 53/562* (2013.01); *B29C 66/1122* (2013.01); *B29C 66/4322* (2013.01); *B29C 66/45* (2013.01); *B29C 66/49* (2013.01); *B29C 66/721* (2013.01); *B29C 66/729* (2013.01); *B29C 66/72141* (2013.01); *B29C 66/73921* (2013.01); *B29C 66/8362* (2013.01); *B29C 66/83413* (2013.01); *B29C 70/32* (2013.01); *B29C 70/386* (2013.01); *B32B 5/12* (2013.01); *B32B 27/12* (2013.01); *F03D 1/0675* (2013.01); *B29C 65/103* (2013.01);
(Continued)

(58) Field of Classification Search
None
See application file for complete search history.

(56) References Cited

U.S. PATENT DOCUMENTS 3,700,527 A * 10/1972 Grosh ................... B29C 41/085
156/174
5,445,701 A * 8/1995 Koba .................... B29C 70/504
100/303

(Continued)

FOREIGN PATENT DOCUMENTS

EP       0463611 A2 *  1/1992

OTHER PUBLICATIONS

Lamontia, et al, "Manufacturing Flat and Cylindrical Lamiantes and Build Up Structure Using Automated Thermoplastic Tape Laying, Fiber Placement and Filament Winding", SAMPE Journal, 39(2), 2003, pp. 30-38.*

(Continued)

*Primary Examiner* — Jeffry H Aftergut
(74) *Attorney, Agent, or Firm* — Robert D. Touslee

(57) ABSTRACT

A thermoplastic product includes a fabric-based reinforcing sheet and a polymerized thermoplastic material. The fabric-based reinforcing sheet is wound about a mandrel to form a plurality of layers having a cross-sectional shape that corresponds to the mandrel. The fabric-based reinforcing sheet includes a plurality of fiber bundles, which may have a bidirectional orientation or configuration. A polymerized thermoplastic material is disposed within each layer of the fabric-based reinforcing sheet. The polymerized thermoplastic material bonds each layer of the fabric-based reinforcing sheet to an adjacent layer.

14 Claims, 4 Drawing Sheets

(51) Int. Cl.
  *B32B 5/12*    (2006.01)
  *B32B 27/12*   (2006.01)
  *B29C 65/00*   (2006.01)
  *B29C 70/38*   (2006.01)
  *B29C 53/56*   (2006.01)
  *F03D 1/06*    (2006.01)
  *B29K 101/12*  (2006.01)
  *B29K 105/08*  (2006.01)
  *B29L 23/00*   (2006.01)
  *B29C 65/14*   (2006.01)
  *B29L 31/08*   (2006.01)
  *B29C 65/16*   (2006.01)
  *B29C 65/10*   (2006.01)
  *F16L 9/16*    (2006.01)

(52) U.S. Cl.
  CPC ........ *B29C 65/106* (2013.01); *B29C 65/1412* (2013.01); *B29C 65/1432* (2013.01); *B29C 65/1632* (2013.01); *B29C 66/71* (2013.01); *B29C 66/7212* (2013.01); *B29K 2101/12* (2013.01); *B29K 2105/0872* (2013.01); *B29L 2023/00* (2013.01); *B29L 2031/085* (2013.01); *B32B 2260/046* (2013.01); *B32B 2262/101* (2013.01); *B32B 2262/106* (2013.01); *B32B 2305/10* (2013.01); *B32B 2398/20* (2013.01); *B32B 2603/00* (2013.01); *F05B 2280/4007* (2013.01); *F16L 9/16* (2013.01); *Y02E 10/721* (2013.01); *Y02P 70/523* (2015.11)

(56) References Cited

U.S. PATENT DOCUMENTS

| | | | | |
|---|---|---|---|---|
| 5,587,041 | A * | 12/1996 | Sandusky | B29C 53/8016 |
| | | | | 156/166 |
| 6,369,157 | B1 * | 4/2002 | Winckler | B29C 67/246 |
| | | | | 264/257 |
| 8,378,094 | B2 | 2/2013 | Shooshtari et al. | |
| 8,883,908 | B2 * | 11/2014 | Gleich | B29B 15/125 |
| | | | | 524/494 |
| 9,186,852 | B2 | 11/2015 | Zhang et al. | |
| 2006/0073311 | A1 | 4/2006 | Hogg | |
| 2006/0100364 | A1 * | 5/2006 | Williamson | B29C 67/246 |
| | | | | 524/701 |
| 2008/0047657 | A1 * | 2/2008 | Jander | B29C 70/14 |
| | | | | 156/166 |
| 2010/0286343 | A1 | 11/2010 | Burghardt et al. | |
| 2015/0145165 | A1 * | 5/2015 | Zhang | D06M 15/51 |
| | | | | 264/257 |
| 2016/0046107 | A1 | 2/2016 | Zhang et al. | |

OTHER PUBLICATIONS

Mack, et al "Filament Winding Process in Thermopalstics", Manufacturing Techniques for Polymer Matrix Composites (PMCs), a volume in Woodhead Publishing Series in Composites Science and ENgineering, 2012, pp. 182-208.*

Beyeler, et al, "Experimental Investigation of Laser-Assisted Thermoplastic Tape Consolidation", Journal of Thermoplastic Composite Materials, vol. 1, Jan. 1988, pp. 107-121.*

Buijs et al, "A Study of Consolidation in Filament Winding with Thermoplastic Prepregs", Journal of Thermoplastic Composite Materials, vol. 5, Oct. 1992, pp. 276-286.*

Meyer et al, "Hot Forming Behavior of Non-Crimp Fabreic PEEK/C Themroplastic COmpsites", Composite Striuctures 90 (2009), 225-232.*

Bibo, et al ,"Carbon-Fibre Non-Crimp Fabric Laminates for Cost-Effective Damage-Tolerant Structures", Composites Science and Technology, vol. 58 No. 1 ( Jan. 1998), 129-143.*

U.S. Appl. No. 14/794,634, filed Jul. 8, 2015.
U.S. Appl. No. 14/7845,007, filed Sep. 3, 2015.
U.S. Appl. No. 14/880,307, filed Oct. 12, 2015.

* cited by examiner

METHODS OF PRODUCING THERMOPLASTIC COMPOSITES USING FABRIC-BASED THERMOPLASTIC PREPREGS

BACKGROUND

The use of fiber-reinforced composites is growing in popularity with applications in transportation, consumer goods, wind energy, and infrastructure. Some of the many reasons for choosing composites over traditional materials such as metals, wood, or non-reinforced plastics include reduced weight, corrosion resistance, and improved mechanical strength. Thermoset materials are used in many of the fiber-reinforced composites. The reinforcing fibers are commonly infused with the thermoset materials during production of the fiber-reinforced composites. The thermoset materials may then be cured or polymerized. A common method of producing such fiber-reinforced composites is filament winding where a thermoset resin infused fiber roving is wound about a mandrel.

BRIEF SUMMARY

The embodiments described herein provide reinforced thermoplastic products having improved properties over conventional products. The manufacture of the reinforced thermoplastic products is also greatly simplified. According to one aspect, a reinforced thermoplastic product has a tube shaped main body having a hollow interior. The tube shaped main body includes a fabric-based reinforcing sheet and a thermoplastic polymer material. The fabric-based reinforcing sheet is wound about an axis of the tube shaped main body to form a plurality of circumferentially positioned layers. The fabric-based reinforcing sheet includes a plurality of fiber bundles that are oriented along a first direction and a second direction, with the second direction having an angled orientation relative to the first direction.

The thermoplastic polymer material is saturated within each of the circumferentially positioned layers of the fabric-based reinforcing sheet and fully impregnates each fiber bundle of the plurality of fiber bundles of each layer. The layers of the fabric-based reinforcing sheet and the thermoplastic polymer material form a unitary thermoplastic product.

According to another aspect, a thermoplastic product has a main body that includes a fabric-based reinforcing sheet and a polymerized thermoplastic material. The fabric-based reinforcing sheet is wound about a mandrel to form a plurality of layers having a cross-sectional shape that corresponds to the mandrel. The fabric-based reinforcing sheet also includes a plurality of fiber bundles. The polymerized thermoplastic material is disposed within each layer of the fabric-based reinforcing sheet. The polymerized thermoplastic material bonds each layer of the fabric-based reinforcing sheet to an adjacent layer of the fabric-based reinforcing sheet. The plurality of layers of the fabric-based reinforcing sheet and the polymerized thermoplastic material form a unitary thermoplastic product.

According to another aspect, a method of forming a reinforced thermoplastic product includes winding a fabric-based thermoplastic prepreg about a mandrel to form a plurality of layers of the thermoplastic prepreg around the mandrel. The thermoplastic prepreg includes a plurality of fiber bundles and a polymerized thermoplastic material that is disposed within each layer of the plurality of layers of the thermoplastic prepreg. The method also includes applying heat to the thermoplastic prepreg as it is wound about the mandrel to at least partially melt or soften the polymerized thermoplastic material along the nip line and applying pressure to the at least partially melted or softened polymerized thermoplastic material of the prepreg sheet, so as to weld an inner surface of an outer layer of the thermoplastic prepreg to an outer surface of an inner layer of the thermoplastic prepreg. Said method does not involve curing or polymerization. In some embodiments, the method may also include cooling the at least partially melted or softened polymerized thermoplastic material of the prepreg sheet.

According to another aspect, a thermoplastic product includes a main body and a polymerized thermoplastic material. The main body includes a plurality of layers of a woven fabric reinforcing sheet with a shape that corresponds to a mandrel. Each layer of the woven fabric reinforcing sheet includes a plurality of fiber bundles that are oriented according to a first direction and a second direction with the second direction having an angled orientation relative to the first direction. The polymerized thermoplastic material is saturated within each layer of the woven fabric reinforcing sheet and fully impregnates each fiber bundle of the plurality of fiber bundles. The woven fabric reinforcing sheet and the polymerized thermoplastic material form a unitary thermoplastic product.

According to another aspect, a method of forming a reinforced thermoplastic product includes positioning a thermoplastic prepreg atop previously consolidated thermoplastic prepregs so that the thermoplastic prepreg forms an outer layer of the reinforced thermoplastic product. The thermoplastic prepreg includes a plurality of fiber bundles that are oriented according to a first direction and a second direction, with the second direction having an angled orientation relative to the first direction, and a polymerized thermoplastic material that fully impregnates each fiber bundle of the plurality of fiber bundles. The method also includes moving a pressure application component along a top surface of the thermoplastic prepreg and applying heat and pressure to the thermoplastic prepreg as the pressure application component is moved along the top surface thereof to at least partially melt or soften the polymerized thermoplastic material. The method further includes welding the thermoplastic prepreg to the previously consolidated thermoplastic prepregs. Said method does not involve curing or polymerization. In some embodiments, the method also includes cooling the at least partially melted or softened polymerized thermoplastic material of the prepreg sheet.

BRIEF DESCRIPTION OF THE DRAWINGS

The present technology is described in conjunction with the appended figures.

Figure 1:
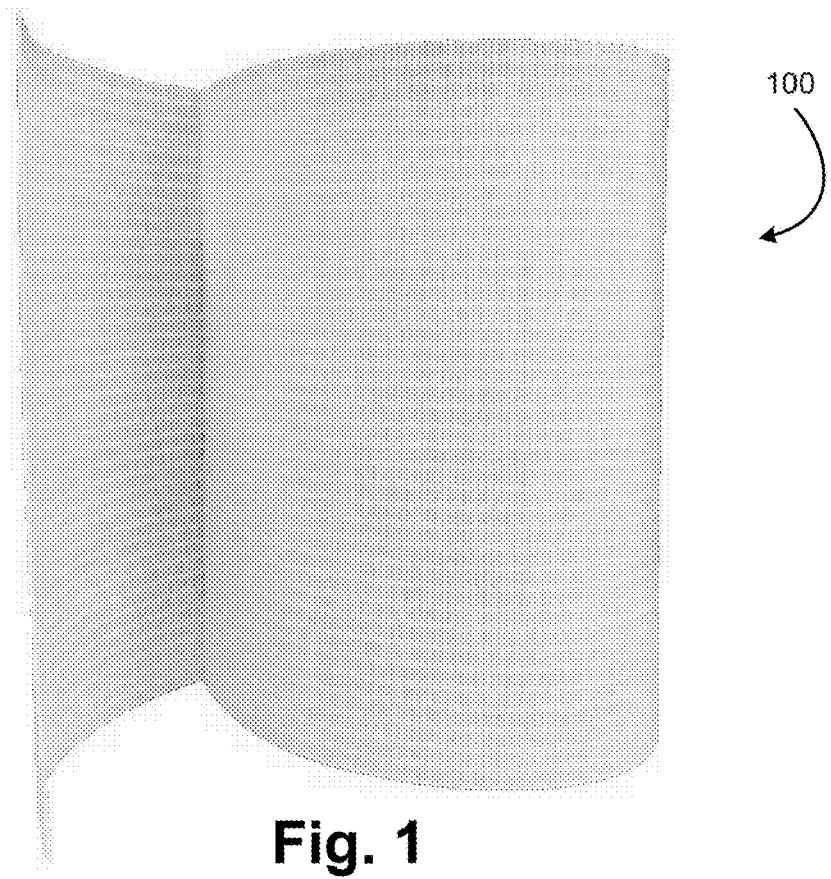
FIG. 1 illustrates a roll of a fabric-based thermoplastic prepreg.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The embodiments described herein relate to products that employ fabric-based thermoplastic prepreg products and to methods of using fabric-based thermoplastic prepreg products in the manufacturing various products. The prepreg products are preferably fully impregnated with thermoplastic materials and may be reheated and consolidated into a given shape. In some embodiments, the prepreg products may be made using reactive thermoplastic resins. Reactive thermoplastic resins include monomers or oligomers that may in situ polymerize to form thermoplastic polymers. Exemplary reactive thermoplastic resins include, but not limited to, lactams such as caprolactam and laurolactam, acrylates, methacrylates such as methyl methacrylate, cyclic olefins such as norbornene and cyclopentene, macrocyclic polyester oligomers such as cyclic butylene terephthalate (CBT), macrocyclic Bisphenol-A oligomers, and thermoplastic polyurethanes. In an exemplary embodiment, the reactive thermoplastic resin comprises caprolactam.

In other embodiments, the prepreg products may be made using a dispersion of a polymeric powder material or a polymeric film that is softened and/or melted to form the prepreg. The products made by the processes described herein exhibit increased isotropic properties or characteristics than those achieved or exhibited in conventional thermoplastic wound products due to the use of the fabric-based thermoplastic prepregs and the fiber orientations within the products that may be achieved due to the use of these materials.

The prepreg products may be used in various processes including winding processes and laying processes. Filament winding is a type of winding process. Filament winding has been widely used to produce axisymmetrical thermoset composites with continuous fiber reinforcement. Filament winding may be used for applications such as producing cylinders and pressure vessels. The process involves winding thermoset resin impregnated filaments over a rotating mandrel.

Filament strands, such as glass or carbon fibers, are typically impregnated in a bath of thermoset resin as they arc wound onto the mandrel. Once the mandrel is covered to a desired thickness, the resin is cured in an oven or under radiant heaters. Conventional filament winding is limited to the use of thermoset resins due to their relatively low viscosity, which is suitable for in line impregnation of the fiber strands. The use of thermoset resins, however, has a number of drawbacks. For example, the slipping of the fiber strands (e.g., rovings and tows) on or about the mandrel limits the fiber orientations that may be achieved in the final part.

In addition, in the manufacturing of large and thick composite parts, the exothermic curing reaction of the thermoset resins may create problems. As large and thick composite parts contain considerable amounts of thermoset resins, the large amount heat generation from the exothermal curing reaction may destroy the composite part during curing. Often times a low curing temperature or a slow curing thermoset resin is used, which greatly increases the manufacturing time. Moreover, the resulting composite parts contain cross-linked thermoset resin matrix and, therefore, they cannot be recycled.

In contrast to thermoset resins, thermoplastic resins offer several advantages including: unlimited shelf life, high fracture toughness, recyclability, and continuous processing without the need for curing. Thermoplastic polymer resins, however, typically have melt viscosities that are significantly greater than thermoset resins and, therefore, they are not suitable for conventional filament winding where inline impregnation of fiber strands is required.

In the embodiments herein, fabric-based thermoplastic prepregs are used in the winding or laying process. In an exemplary embodiment, the fabric-based thermoplastic prepregs (hereinafter thermoplastic prepregs) are fully impregnated with the thermoplastic material, although partially impregnated prepregs may also be used. In some embodiments, these thermoplastic prepregs can be produced through impregnation of the fabric materials with low viscosity monomers or oligomers, followed by in-situ polymerization to form a thermoplastic matrix. Exemplary methods of producing fully impregnated thermoplastic prepregs are further described in U.S. patent application Ser. No. 14/088,034, filed Nov. 22, 2013, entitled "Fiber-Containing Prepregs and Methods and Systems of Making"; U.S. patent application Ser. No. 14/794,634, filed Jul. 8, 2015, entitled "System for Producing a Fully Impregnated Thermoplastic Prepreg"; U.S. patent application Ser. No. 14/845,007, filed Sep. 3, 2015, entitled "System for Producing a Fully Impregnated Thermoplastic Prepreg"; U.S. patent application Ser. No. 14/880,307, filed Oct. 12, 2015, entitled "System for Producing a Fully Impregnated Thermoplastic Prepreg"; and U.S. Pat. No. 9,186,852, entitled "Fiber-Containing Prepregs and Methods and Systems of Making". Each of the above U.S. patents and U.S. patent applications are incorporated by reference herein.

In other embodiments, the thermoplastic prepregs can be produced through the use of a thermoplastic polymer powder material that is positioned and impregnated within the fabric, or through the use of a thermoplastic polymer film that is positioned atop the fabric material and impregnated within the fabric under heat and pressure. Exemplary methods of producing such thermoplastic prepregs are further described in U.S. patent application Ser. No. 13/915,023, filed Jun. 11, 2013, entitled "Sized Glass Fibers for Fiber-Containing Composite Articles and Methods of Making Them", the entire disclosure of which is incorporated by reference herein.

Fabric-Based Thermoplastic Prepregs

Referring now to FIG. 1, illustrated is an example of a fabric-based thermoplastic prepreg 100 that may be used in the various processes described herein. In an exemplary embodiment, the thermoplastic prepreg 100 may be fully impregnated with the thermoplastic material. For example, a Nylon-6 prepreg may be produced through the impregnation of a reinforcement fabric with molten caprolactam followed by in-situ anionic polymerization of the caprolactam.

The fabric-based thermoplastic prepreg 100 (also referred to as a fabric-based reinforcing sheet) may include a plurality of fibers, rovings, or fiber bundles (hereinafter fiber bundles or rovings). The rovings may contain continuous glass fibers or other fibers. In some embodiments, the rovings may be woven together. In other embodiments, the rovings may be held together via stitching, or the fibers may be entangled and intermeshed in a randomly oriented configuration. In embodiments that employ stitching, the stitching threads that are used may be polymeric fibers, glass fibers, or other fibers. The term roving or fiber bundle as used herein refers to a bundle of fibers that are positioned adjacent one another to form a rope, thread, or cord like component. A common type of fiber that is used in the rovings is glass fibers, although various other fibers could be used such as carbon fibers, basalt fibers, metal fibers, ceramic fiber, natural fibers, synthetic organic fibers such as aramid fibers, and other inorganic fibers. Exemplary glass fibers may include "E-glass", "A-glass", "C-glass", "S-glass", "ECR-glass" (corrosion resistant glass), "T-glass", and fluorine and/or boron-free derivatives thereof.

In some embodiments, the rovings may be oriented along a first direction and along a second direction that is angled relative to the first direction. For example, the second direction may be angled relative to the first direction by 45 degrees, 90 degrees, and the like. The woven materials are materials that are produced by weaving multiple roving strands together. The roving strands are commonly woven so that a first plurality of strands extend in a first direction (e.g., weft direction) and a second plurality of strands extend in a second direction that is typically orthogonal to the first direction (e.g., warp direction). The first plurality of strands are roughly parallel with one another as are the second plurality of strands. Various weaves may be used to form the fabric-based thermoplastic prepreg 100 described herein, including: plain weaves, twill weaves, satin weaves, multi-axial weaves, or stitching. The fabric-based thermoplastic prepreg 100 that is employed may contain any kind of woven fabric, stitched fabric, or multi-axial fabric material. The fabric-based thermoplastic prepreg 100 may also contain chopped fibers in addition to the continuous fibers. The fabric-based thermoplastic prepreg 100 may be a hybrid from different type of fibers. For example, the fabric-based thermoplastic prepreg may contain both glass and carbon fibers. For ease in describing the embodiments herein, the embodiments will generally refer to the use of glass fibers, although it should be realized that various other fiber types may be used.

The embodiments wherein the rovings are oriented along at least two directions or orientations, or where the rovings are held together via stitching, are different than conventional thermoplastic tapes that include pre-impregnated unidirectionally oriented rovings where the rovings are oriented along a single direction (e.g., the longitudinal direction of the tape). These unidirectional thermoplastic tapes highly limit the fiber orientations that are achieved in the resulting composite parts from a winding process. For example, the tapes cannot be oriented so that the rovings are aligned longitudinally with the resulting composite parts. Relatively low longitudinal strengths can be achieved in the composite parts employing unidirectional thermoplastic tapes, due to the limitation in how these tapes may be wound around a mandrel. As a result, the thermoplastic composites that are made with unidirectional thermoplastic tapes are limited to applications where significant longitudinal strengths are not needed.

The fabric-based thermoplastic prepreg 100 includes a thermoplastic polymer material that is at least partially saturated or impregnated within the fabric material so that at least some of the fiber bundles are impregnated with the thermoplastic material. In some embodiments, the fabric-based thermoplastic prepreg 100 may be fully impregnated with the thermoplastic polymer material. For example, thermoplastic prepregs that are manufactured according to the disclosures of the '034, '634, '007, and/or '307 application incorporated by reference herein and/or the '852 patent incorporated by reference herein may be used, which prepregs are fully impregnated with a thermoplastic polymer material. In such embodiments, the thermoplastic polymer material fully impregnates each fiber bundle of the fabric-based thermoplastic prepreg 100.

FIG. 1 illustrates a roll of the fabric-based thermoplastic prepreg 100. The fabric-based thermoplastic prepreg 100 is a flexible material with a high content of reinforcing fibers. As described herein, the fabric-based thermoplastic prepreg 100 may include a plurality of rovings that are woven together with the rovings oriented along multiple directions. As described herein, when the fabric-based thermoplastic prepreg 100 is subjected to a subsequent heating and/or pressure process, the thermoplastic polymer melts or softens to allow the thermoplastic prepreg to be welded or consolidated into a composite part.

Since the fabric-based thermoplastic prepreg 100 is based on fabrics (often woven fabrics), the fiber distribution and orientation needed for a given application can be pre-built into the fabric design. This provides significant advantages over conventional filament winding processes and processes that include unidirectional thermoplastic tapes since the process is much quicker and since the complex distribution and orientation of the fibers cannot be achieved via filament winding and/or unidirectional thermoplastic tapes. Accordingly, the fabric-based thermoplastic prepregs 100 provide significantly higher design freedom and can be used to produce reinforced thermoplastic composite parts which are not attainable through filament winding and/or winding of unidirectional thermoplastic tapes. A specific example of this advantage is provided in applications where longitudinal strength is needed. In such applications, the fabric-based thermoplastic prepreg 100 can be formed from fabrics with a required amount of fibers oriented along a longitudinal direction of the desired end product.

In addition, the fabric-based thermoplastic prepreg 100 allows the winding process to be significantly simplified since the non-circumferential strength (e.g., the axial or longitudinal strength) of the resulting composite relies on the fabric design employed in the fabric-based thermoplastic prepreg 100 rather than on the winding pattern employed in filament or unidirectional tape winding. Typically, a circumferential winding is all that is needed for the fabric-based thermoplastic prepregs 100, which simplifies the process and increases productivity. Stated differently, since the fiber orientation and distribution is pre-built into the fabric, the fabric-based thermoplastic prepreg 100 does not need to be angled relative to, or applied diagonally about the mandrel during the winding process, which is required with filament winding and/or unidirectional tapes in order to achieve a non-circumferential orientation of the fibers.

An additional benefit may be realized in embodiments that employ fabric-based thermoplastic prepregs 100 produced through in-situ polymerization of reactive monomers or oligomers. In such embodiments, the fiber sizings can be developed to impart strong chemical bonding between the reinforcing fibers and the thermoplastic resin matrix. As such, a significant improvement in the composite property can be achieved, especially in comparison with unidirectional thermoplastic tapes produced from thermoplastic polymer resins. For example, reinforcing fibers in the fabric-based thermoplastic prepregs may be sized with a sizing composition that contains a polymerization agent for monomers or oligomers. Exemplary polymerization agents for the in-situ anionic polymerization of caprolactam may include coupling activator compound described in U.S. patent application Ser. No. 12/008,041, filed Jan. 8, 2008, entitled "Surfaces Containing Coupling Activator Compounds and Reinforced Composites Produced Therefrom"; and U.S. patent application Ser. No. 12/724,024, filed May 15, 2010, entitled "Polymerization Initiators for Fiber-Reinforced Polymer Composites and Materials Made from the Composites", which are incorporated herein by reference for all purposes.

Systems for Manufacturing Fabric-Based Thermoplastic Prepreg Products

Figure 2:
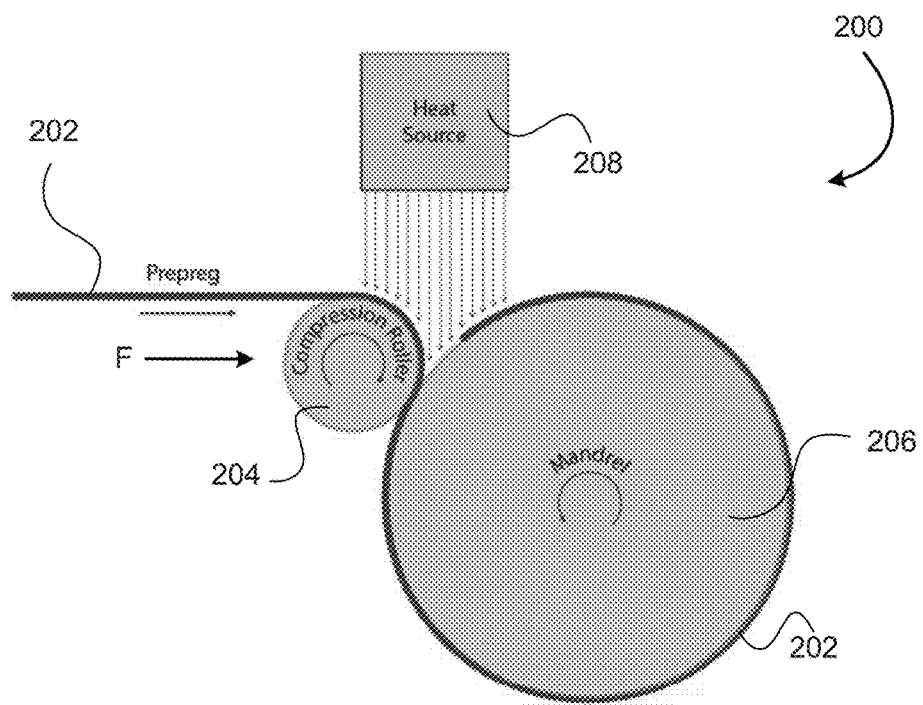
FIG. 2 illustrates a winding process that employs a fabric-based thermoplastic prepreg.

Referring now to FIG. 2, illustrated is a winding process 200 that employs a fabric-based thermoplastic prepreg 202. The fabric-based thermoplastic prepreg 202 is wound about a mandrel 206 one or more times to create one or more layers of the fabric-based thermoplastic prepreg 202 atop the mandrel 206. The one or more layers of the fabric-based thermoplastic prepreg 202 are in-situ welded or coupled together as they are wound about the mandrel 206 to create a product having a cross sectional shape that corresponds to the shape of the mandrel 206.

The prepreg winding process may involve a compaction force F that is applied via a pressure application device 204, such as a compression roller, nip, or bar, that is moved or pressed radially toward the mandrel 206 with the fabric-based thermoplastic prepreg 202 positioned there between. The compaction force F may be applied by the compression roller 204 to create an intimate contact between the joining or mating surfaces of an underlying fabric-based thermoplastic prepreg 202 and a fabric-based thermoplastic prepreg 202 positioned atop the underlying fabric-based thermoplastic prepreg 202. The compaction force F may aid in welding or coupling the two layers of the fabric-based thermoplastic prepreg 202.

Local heating is applied via a heating source 208, typically along the nip line between the two layers of the fabric-based thermoplastic prepregs 202 during the winding process. The local heating is applied to melt the thermoplastic resin of the fabric-based thermoplastic prepreg 202 along the nip line. The local heating may be applied to melt the resin of both the underlying fabric-based thermoplastic prepreg 202 and the fabric-based thermoplastic prepreg 202 being applied atop the underlying prepreg. In this manner, the two fabric-based thermoplastic prepreg 202 layers that are being welded or coupled together may both be in a weldable or couplable state. In some embodiments, the heating source 208 may be moveable relative to the mandrel 206 and/or roller 204 to vary the location of the applied local heat.

The local heating may be applied to the prepreg surfaces to effect diffusion of the polymer chains through the contact areas of the layers of the fabric-based thermoplastic prepreg 202. Local heating of the fabric-based thermoplastic prepregs 202 along the nip line during the winding process can be achieved by a variety of methods, including but not limited to, laser radiation, infrared heating, hot gas, direct flame, and the like.

Figure 4:
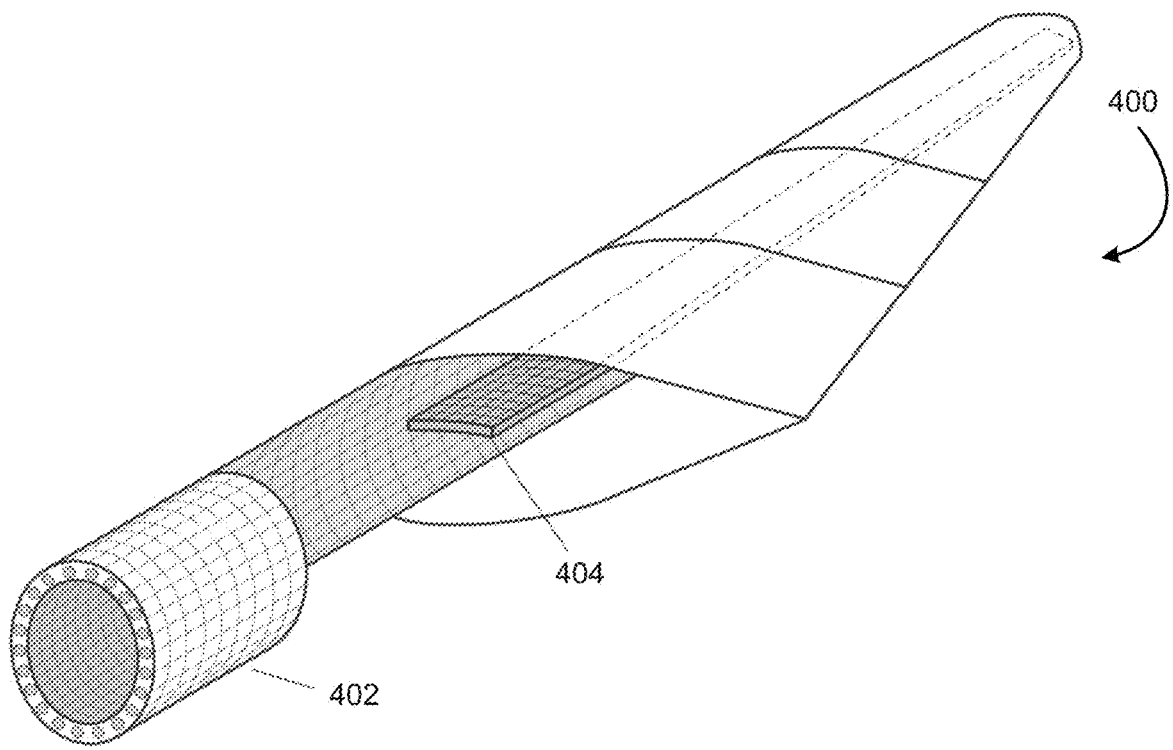
FIG. 4 illustrates a wind turbine blade that includes one or more components made of or from a fabric-based thermoplastic prepreg.

The winding process of FIG. 2 can be used to produce various products including, but not limited to, pipes, cylinders, tanks, components for wind turbine blades, and the like. An exemplary application of the prepreg winding is to produce roots for wind turbine blades as illustrated in FIG. 4. Winding of fully impregnated thermoplastic prepregs, such as Nylon-6 prepregs produced through the impregnation of reinforcing fabrics with caprolactam, can be used to produce thermoplastic composite products with superior properties, such as high fracture toughness, high impact resistance, and recyclability. Additionally, the prepreg winding process may be conducted under tension, which ensures or maintains the fiber orientation and prevents fabric wrinkling.

Figure 3:
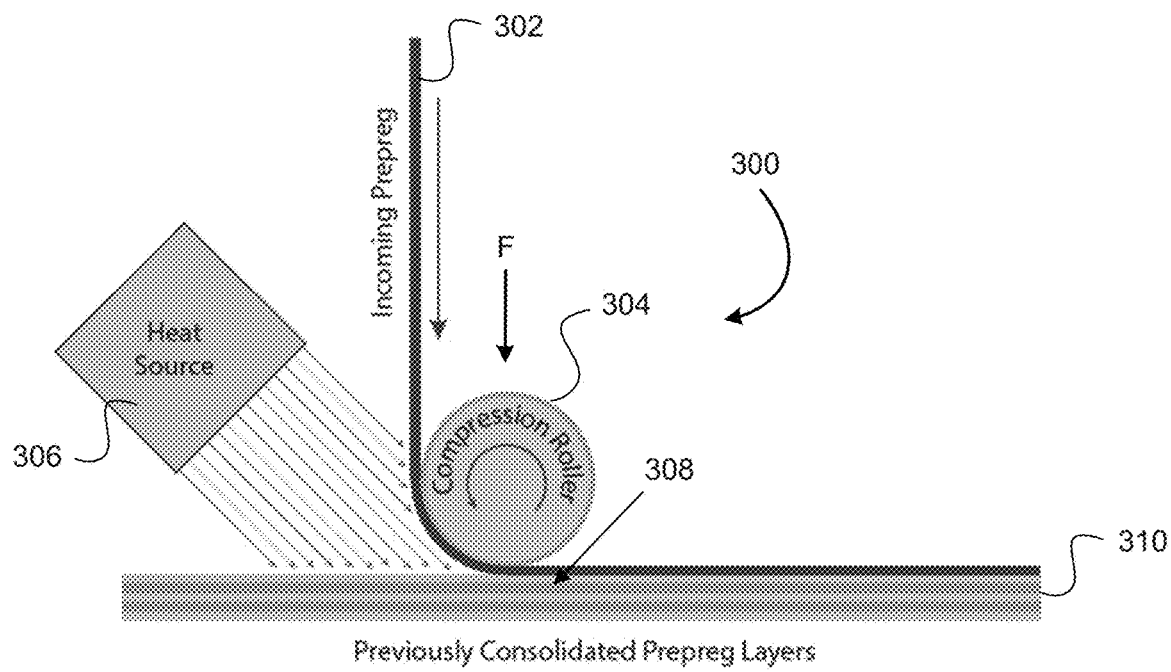
FIG. 3 illustrates a prepreg laying process that employs a fabric-based thermoplastic prepreg.

Referring now to FIG. 3, illustrated is a prepreg laying process 300 that employs a fabric-based thermoplastic prepreg 302. High performance thermoplastic composite laminates can be produced through the process of laying and in-situ welding of the fabric-based thermoplastic prepregs 302. In the process 300, a fabric-based thermoplastic prepreg 302 is laid atop one or more underlying fabric-based thermoplastic prepregs 310, which may be previously consolidated or welded prepregs that form multiple layers. The one or more underlying fabric-based thermoplastic prepregs 310 may be positioned atop a substrate, a mold, and the like, and may have a shape or configuration that correspond to the substrate or mold.

As the fabric-based thermoplastic prepreg 302 is laid, a pressure application component 304, such as a compression roller, bar, or nip, is passed over the fabric-based thermoplastic prepreg 302 and applies a downward force F to the fabric-based thermoplastic prepreg 302 and previously consolidated prepreg layers 310. Heat may be applied from a heat source 306 to the prepregs along the nip line to melt or soften the thermoplastic material of the fabric-based thermoplastic prepreg 302 and one or more of the previously consolidated prepreg layers 310. The compression roller 304 may be moved across the prepreg layers at a given velocity depending on various factors, including the thickness of the material. The application of a downward force F and applied heat 306 may form a heat applied zone 308 in which the thermoplastic material is sufficiently melted or softened for welding of the prepreg layers.

Conventional tape laying processes employ unidirectional tapes. Different fiber orientations are achieved through sequential laying of individual layers of the unidirectional tapes along different directions. The tape laying process is time consuming and generates a significant amount of waste through cutting of the unidirectional tapes to the dimension needed for tape laying. In contrast, the laying of the fabric-based thermoplastic prepreg 302 is significantly faster and effective, as the desired fiber orientation and distribution is achieved through the fabric design, rather than through the application of the unidirectional tapes along different directions.

Fabric-Based Thermoplastic Prepreg Products

An exemplary application of the fabric-based thermoplastic prepreg 302 laying process is the production of spar caps 404 for wind turbine blades 400, which is illustrated in FIG. 4. Wind turbine blades 400 are commonly extremely large components (e.g., 50 meters or greater). The large sizes of these components make employing reactive thermoplastic resins, via processes such as vacuum infusion, extremely difficult. For example, the sensitivity of reactive thermoplastic resins to various conditions, such as the moisture sensitivity of the in-situ anionic polymerization of caprolactam, renders the use of such materials extremely difficult for large composite components. As such, various components of wind turbine blades, such as spar caps and root sections, are conventionally produced through vacuum infusion of thermoset resins, such as epoxy.

In contrast to the conventional processes, laying and in-situ welding of fabric-based thermoplastic prepregs 302 can be used to produce thermoplastic composite spar caps 404 with superior mechanical properties. FIG. 4 also shows a thick circular root section 402 consisting of fiber reinforced composites. The root section 402 is normally positioned on the root of the wind turbine blade 400 and is the component that is attached to the rotor. The root section 402 extends into the wind turbine blade 400 and is bolted to the rotor. As described above, winding of fabric-based thermoplastic prepregs 202, such as Nylon-6 prepregs, can be used to produce thermoplastic composite root sections 402 with superior properties, such as high fracture toughness, high impact resistance, and recyclability. The prepreg winding process may also be conducted under tension to ensure the fiber orientation and prevent fabric wrinkling. As such, the prepreg winding process 200 can produce thermoplastic composite root sections 402 with superior mechanical properties. Other components of the wind turbine 400 may likewise be made of or from one or more fabric-based thermoplastic prepregs.

Figure 5:
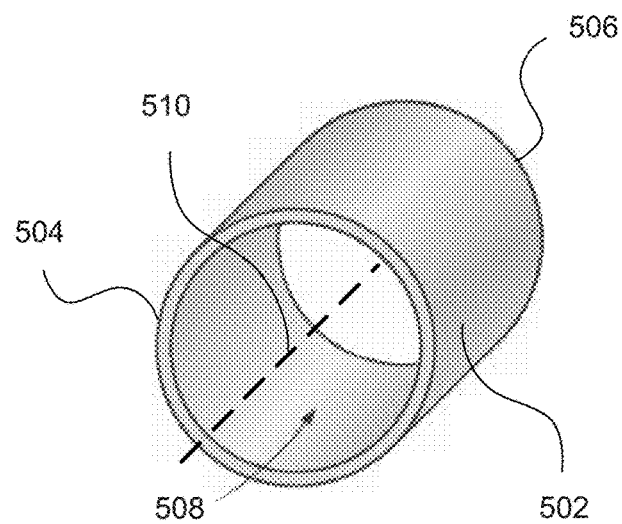
FIG. 5 illustrates an embodiment of a reinforced thermoplastic product that includes a tube shaped main body having a circular cross-section.

Referring now to FIG. 5, illustrated is an embodiment of a reinforced thermoplastic product that includes a tube shaped main body 502 having a hollow interior 508 and a longitudinal length extending between a first end 504 and a second end 506. The tube shaped main body 502 includes a fabric-based reinforcing sheet or prepreg. The fabric-based reinforcing sheet includes a plurality of fiber bundles or rovings. In one embodiment, the rovings may be woven together so that the rovings are oriented along a first direction and along a second direction having an angled orientation relative to the first direction. In other embodiments, the rovings may be held together via stitching or threads. In yet another embodiment, the fabric-based reinforcing sheet may be a nonwoven material having randomly oriented entangled fibers.

The fabric-based reinforcing sheet includes a polymerized thermoplastic material that may be disposed partially or fully within the fabric-based reinforcing sheet as described herein. In an exemplary embodiment, the fabric-based reinforcing sheet is fully saturated or impregnated with the polymerized thermoplastic material so that each of the rovings, and the individual fibers contained therein, are impregnated, saturated, or otherwise in contact with the polymerized thermoplastic material.

The tube shaped main body 502 is formed by winding the fabric-based reinforcing sheet about an axis 510 of the tube shaped main body, such as a tubular shaped mandrel. The fabric-based reinforcing sheet may be wound about the mandrel to form a plurality of circumferentially positioned layers of the fabric-based reinforcing sheet. The various layers of the fabric-based reinforcing sheets are welded or coupled together by melting the thermoplastic material along the nip line and allowing the thermoplastic material to re-harden. In some embodiments, the thermoplastic material is saturated within each of the circumferentially positioned layers of the fabric-based reinforcing sheet in which the thermoplastic polymer material fully impregnates each roving or fiber bundle of each layer. The welded fabric reinforcing sheet layers form a unitary thermoplastic product.

In some embodiments, the first direction of the rovings is aligned with the axis 510 or longitudinal direction of the tube shaped main body 502. Because some of the rovings are aligned with the axis 510 of the tube shaped main body 502, the rovings greatly reinforce the product in the longitudinal direction. As described above, it is not possible to orient fibers in this direction with conventional thermoplastic unidirectional tape materials and thus, the fabric-based thermoplastic prepregs described herein provide significant advantages over conventional materials.

The second direction of the rovings may be angled at 45 degrees or 90 degrees relative to the first direction. In a specific embodiment, the second direction of the rovings may be aligned with the circumferential direction so that some of the rovings extend circumferentially around the tube shaped main body 502. The fabric-based reinforcing sheets significantly reinforce the tube shaped main body 502. As such, a thickness of the tube shaped main body's wall may be substantially reduced while maintaining a similar, or even greater, pressure rating. Stated differently, the cylindrical wall of the tube shaped main body 502 may be significantly thinner than conventional polymer based tube products without compromising the products ability to withstand a given pressure.

Figure 6A:
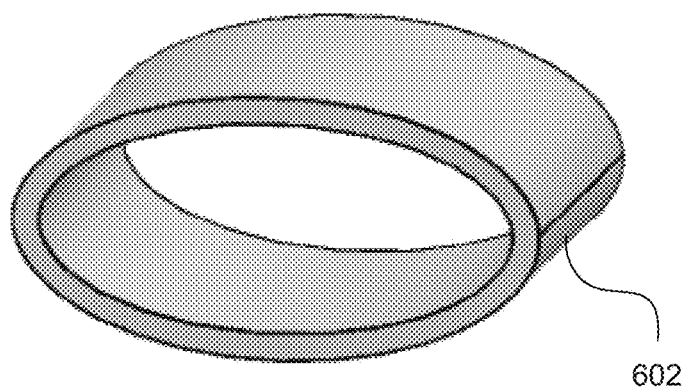
FIGS. 6A-B illustrate other embodiments of reinforced thermoplastic products having non-circular cross-sections.
Figure 6B:
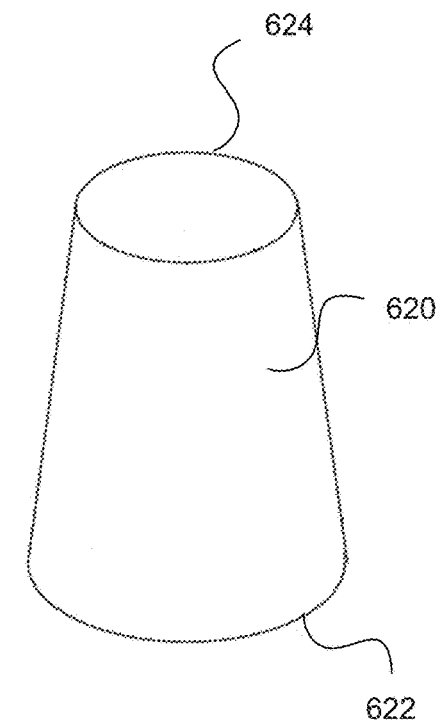

In some instances, the tube shaped main body may have a cylindrical configuration as shown in FIG. 5. In other instances, the tube shaped main body may have a non-circular shaped cross section or configuration. For example, FIG. 6A illustrates a tube shaped main body 602 having an elliptical or oval cross section or configuration. FIG. 6B illustrates a tube shaped main body 620 having a conical shaped configuration where the outer diameter tapers between a first end 622 and a second end 624. It should be realized that various other configurations are possible, such as rectangular shapes, square shapes, or any other shape that may be produced by winding the fabric material about a mandrel. The fabric-based reinforcing sheet may be wound about a correspondingly shaped mandrel to form such shapes. Also, while some embodiments are described as having a hollow interior, it should be recognized that in other instances the tube shaped main body may not have a hollow interior. For example, the mandrel may be left within the tube shaped main body as a solid or non-hollow core or interior. The solid or non-hollow core or interior may be formed for weathering purposes, reinforcement purposes, or other purposes.

As described above, the formation of the reinforced thermoplastic products, such as the tube shaped bodies of FIGS. 5-6B, does not involve a polymerization process. Rather, the polymerization may be previously performed in manufacturing the fabric-based thermoplastic prepregs. As such, the formation of the reinforced thermoplastic products merely involves heating the prepregs to melt the thermoplastic material and to consolidate the prepregs into the thermoplastic composite material.

Another advantage of using some of the thermoplastic prepregs described herein is the ability to wet out essentially all of the bundles of fibers or rovings in the fabric material. For example, in a typical fabric material each roving contains numerous individual fibers (e.g., around 2,400 fibers). The thermoplastic prepregs may be saturated or fully wetted with low viscosity reactive thermoplastic resin material and in-situ polymerized. As such, the resulting product is likewise fully wetted or impregnated with the thermoplastic material. The fully wetted fiber strands of the prepregs can be expected to perform equivalent to, or better than, those used in conventional products.

An additional advantage of the present disclosure is that the final thermoplastic product may include two or more fiber orientations, typically within the same layer, which is not achievable with conventional wound thermoplastic products. As described herein, the use of unidirectional tapes often does not enable fibers to be placed or extend in a longitudinal or axial direction of the wound product since the tapes cannot be wound about the product in an axial or longitudinal direction.

Moreover, the thickness of the unidirectional tape is often significantly lower than that of the fabric-based prepregs described herein. For example, in unidirectional tapes, the roving is often spread laterally before the molten thermoplastic resin is applied. The result is that the unidirectional tape typically is very thin (e.g., 0.2 mm) and includes far fewer individual fibers than the instant prepreg materials. Given the higher density of the fibers employed in the instant prepregs, the thickness of the prepregs may be greater than those of unidirectional tapes. As such, winding of fabric-based prepregs may achieve the desired thickness and strength of the composite materials in a much higher throughput than thin unidirectional tapes.

Further, when unidirectional tapes are employed, the tape is typically wound at an angle relative to the mandrel. This may result in the winding process being interrupted several times to properly orient the tape before winding the tape a subsequent time. In contrast, the instant prepregs that have multiple fiber orientations may allow the winding process to be performed continually without reorienting the prepreg. Stated differently, the prepreg may be continually wound about the mandrel to achieve a desired fiber orientation. The prepreg may also remain oriented circumferentially about the mandrel. For example, one or more edges of the prepreg may be parallel with the circumferential direction of the mandrel.

Methods

Conventional filament winding processes involve a curing or polymerization process. For example, conventional filament winding involves infusing a thermoset material into a bundle of dry filaments that is wound about a mandrel. The infusion of the thermoset material may be achieved by passing the bundle of dry filaments through a bath of the thermoset resin material.

In contrast, the process herein involves a negligible amount of curing or polymerization since the fabric-based prepregs contain a polymerized thermoplastic resin. It should be realized that some minimal amount of curing or polymerization may occur since the polymer resin employed in the prepreg may not be entirely polymerized. However, any polymerization that does occur is insubstantial and is significantly less than that experienced in conventional systems employing thermoset materials that are uncured or unpolymerized. The process employed herein involves a mere heating/melting of the thermoplastic polymer material and a subsequent welding of the material. In some instances, the process may also involve a cooling and solidification of the thermoplastic polymer material.

Figure 7:
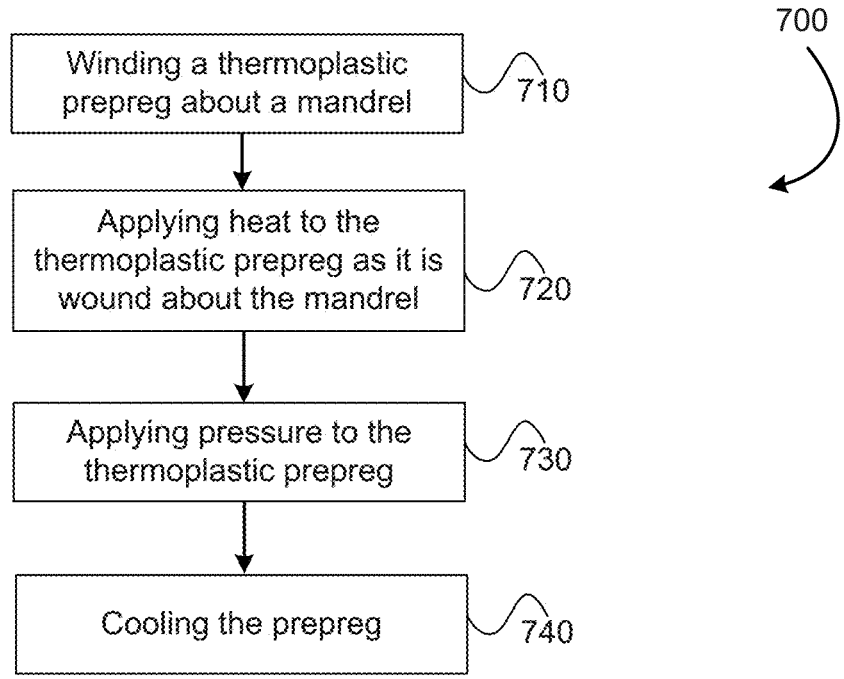
FIG. 7 illustrates a method of forming a reinforced thermoplastic product.

Referring now to FIG. 7, illustrated is a method 700 of forming a reinforced thermoplastic product. At block 710, a fabric-based thermoplastic prepreg is wound about a mandrel. The thermoplastic prepreg may be wound around the mandrel one or more times to form a plurality of layers of the thermoplastic prepreg around the mandrel. The thermoplastic prepreg includes a plurality of fiber bundles or rovings and a polymerized thermoplastic material. In some embodiments, the rovings may be oriented according to a first direction and a second direction wherein the second direction is angled relative to the first direction. In some embodiments, the polymerized thermoplastic material may fully impregnate each fiber bundle of the fabric.

At block 720, heat is applied to the thermoplastic prepreg along the nip line as it is wound about the mandrel to at least partially melt or soften the polymerized thermoplastic material. At block 730, pressure is applied to the at least partially melted or softened polymerized thermoplastic material of the prepreg sheet. At block 740, an inner surface of an outer thermoplastic prepreg layer is welded onto an outer surface of an inner thermoplastic prepreg layer. The method 700 does not involve curing or polymerization. Rather, the method 700 involves heating of the thermoplastic material in order to melt and weld the thermoplastic material. In some instances, the at least partially melted or softened polymerized thermoplastic material may be cooled following the welding of the prepreg layers.

In some instances, winding of the thermoplastic prepreg about the mandrel is performed without moving the thermoplastic prepreg axially or longitudinally along the mandrel. In such instances, the entire winding process, or a portion thereof, may be performed in a single continuous process to the spec. In some instances, the method may further include aligning at least some of the rovings with an axis or longitudinal direction of the mandrel so that said rovings are aligned with the axis or longitudinal direction in the final product. In some instances, the mandrel may be maintained within an interior of the reinforced thermoplastic product after the completion of the winding process so that the mandrel forms part of, or is a component of, the reinforced thermoplastic product.

Figure 8:
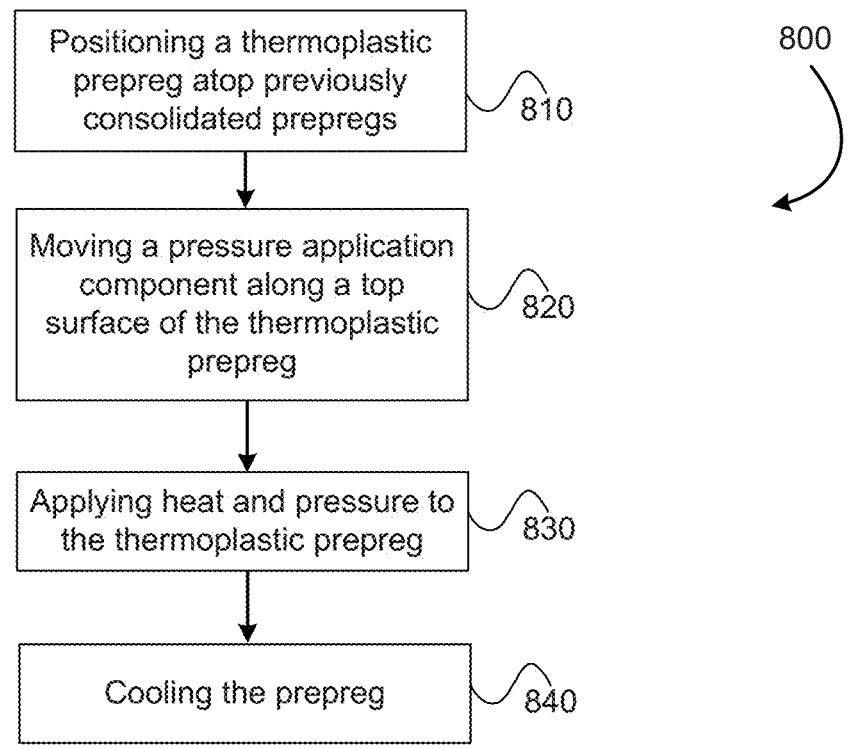
FIG. 8 illustrates another method of forming a reinforced thermoplastic product.

Referring now to FIG. 8, illustrated is another method 800 of forming a reinforced thermoplastic product. At block 810, a thermoplastic prepreg is positioned atop previously consolidated thermoplastic prepregs so that the thermoplastic prepreg forms an outer layer of the reinforced thermoplastic product. The thermoplastic prepreg may include a plurality of fiber bundles that are oriented according to a first direction and a second direction with the second direction having an angled orientation relative to the first direction. The thermoplastic prepreg may have any configuration similar to the prepregs described herein. The thermoplastic prepreg may also have a polymerized thermoplastic material that partially or fully impregnates each fiber bundle of the plurality of fiber bundles as described herein.

At block 820, a pressure application component is moved along a top surface of the thermoplastic prepreg. At block 830, heat and pressure are applied to the thermoplastic prepreg as the pressure application component is moved along the top surface thereof to at least partially melt or soften the polymerized thermoplastic material. At block 840, the at least partially melted or softened polymerized thermoplastic material of the prepreg sheet is welded onto previously consolidated thermoplastic prepregs. The method 800 does not involve curing or polymerization. In some instances, the at least partially melted or softened polymerized thermoplastic may be cooled following the welding of the prepreg sheet onto the previously consolidated thermoplastic prepregs.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the glass fiber" includes reference to one or more glass fibers and equivalents thereof known to those skilled in the art, and so forth. The invention has now been described in detail for the purposes of clarity and understanding. However, it will be appreciated that certain changes and modifications may be practice within the scope of the appended claims.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of forming a reinforced thermoplastic product comprising:
   providing a woven fabric that includes a plurality of fiber bundles that are oriented according to a first direction and a second direction, the second direction being different than the first direction and having an angled orientation relative to the first direction;
   applying low viscosity monomers or oligomers to the woven fabric so that the low viscosity monomer or oligomers fully impregnate or wet each fiber bundle of the plurality of fiber bundles;
   polymerizing the low viscosity monomers or oligomers in-situ to form a thermoplastic material that fully impregnates each fiber bundle of the plurality of fiber bundles and thereby forms a thermoplastic prepreg;
   winding the thermoplastic prepreg about a mandrel to form a plurality of layers of the thermoplastic prepreg around the mandrel;
   applying heat to the thermoplastic prepreg as it is wound about the mandrel to at least partially melt or soften the polymerized thermoplastic material;
   applying pressure to the at least partially melted or softened polymerized thermoplastic material of the thermoplastic prepreg; and
   welding an inner surface of an outer layer of the thermoplastic prepreg to an outer surface of an inner layer of the thermoplastic prepreg;
   wherein the thermoplastic material in the thermoplastic prepreg is fully polymerized prior to winding the thermoplastic prepreg about the mandrel;
   wherein at least some of the fiber bundles of the woven fabric are aligned with an axis or longitudinal direction of the mandrel.

2. The method of claim 1, wherein said winding of the thermoplastic prepreg about the mandrel is performed without moving the thermoplastic prepreg axially or longitudinally along the mandrel.

3. The method of claim 1, further comprising maintaining the mandrel within an interior of the reinforced thermoplastic product so that the mandrel forms part of, or is a component of, the reinforced thermoplastic product.

4. The method of claim 1, wherein welding an inner surface of an outer layer of the thermoplastic prepreg to an outer surface of an inner layer of the thermoplastic prepreg comprises cooling the at least partially melted or softened polymerized thermoplastic material of the thermoplastic prepreg.

5. The method of claim 1, further comprising applying heat to an outer surface of the outer layer of the plurality of layers of the thermoplastic prepreg around the mandrel prior to covering the outer layer of the plurality of layers of the thermoplastic prepreg with another layer of the thermoplastic prepreg.

6. The method of claim 1, wherein prior to winding, the thermoplastic prepreg is heated only once adjacent a nip line defined by the mandrel and a roller configured to apply the pressure to the at least partially melted or softened polymerized thermoplastic material of the thermoplastic prepreg.

7. The method of claim 2, wherein the plurality of layers of the thermoplastic prepreg forms a tube around the mandrel, and wherein a length of the tube is greater than a diameter of the tube.

8. The method of claim 7, wherein the tube is configured to be positioned at a root of a turbine blade and is configured to be attached to a rotor.

9. A method of forming a reinforced thermoplastic product comprising:
   providing a thermoplastic prepreg that includes:
      a woven fabric comprising a plurality of fiber bundles that are oriented according to a first direction and a second direction, the second direction being different than the first direction and having an angled orientation relative to the first direction; and
      a thermoplastic material that fully impregnates each fiber bundle of the plurality of fiber bundles, the thermoplastic material being formed of in-situ polymerization of low viscosity monomers or oligomers;
   positioning the thermoplastic prepreg atop one or more previously consolidated thermoplastic prepregs so that the thermoplastic prepreg forms an outer layer of the reinforced thermoplastic product;
   moving a pressure application component along a top surface of the thermoplastic prepreg;
   applying heat and pressure to the thermoplastic prepreg as the pressure application component is moved along the top surface thereof to at least partially melt or soften the polymerized thermoplastic material; and
   welding the thermoplastic prepreg to the previously consolidated thermoplastic prepregs;
   wherein the thermoplastic material in the thermoplastic prepreg is fully polymerized so that the method does not involve curing or polymerization;
   wherein at least some of the fiber bundles of the woven fabric are aligned with an axis or longitudinal direction of the pressure application component.

10. The method of claim 9, wherein welding the thermoplastic prepreg to the previously consolidated thermoplastic prepregs comprises cooling the at least partially melted or softened polymerized thermoplastic material of the thermoplastic prepreg.

11. The method of claim 9, wherein the reinforced thermoplastic product is formed without moving the thermoplastic prepreg relative to the one or more previously consolidated thermoplastic prepregs along the axis or longitudinal direction of the pressure application component.

12. The method of claim 11, wherein the reinforced thermoplastic product comprises a panel.

13. The method of claim 12, wherein the panel has a length along a moving direction of the pressure application component and a width along the axis of the pressure application component, and wherein the length is greater than the width.

14. The method of claim 13, wherein the length of the panel is at least 50 meters.

\* \* \* \* \*